F. I. DU PONT.
PROCESS FOR PRODUCING OXIDS OF NITROGEN FROM THE AIR.
APPLICATION FILED NOV. 14, 1908.
948,372.
Patented Feb. 8, 1910.
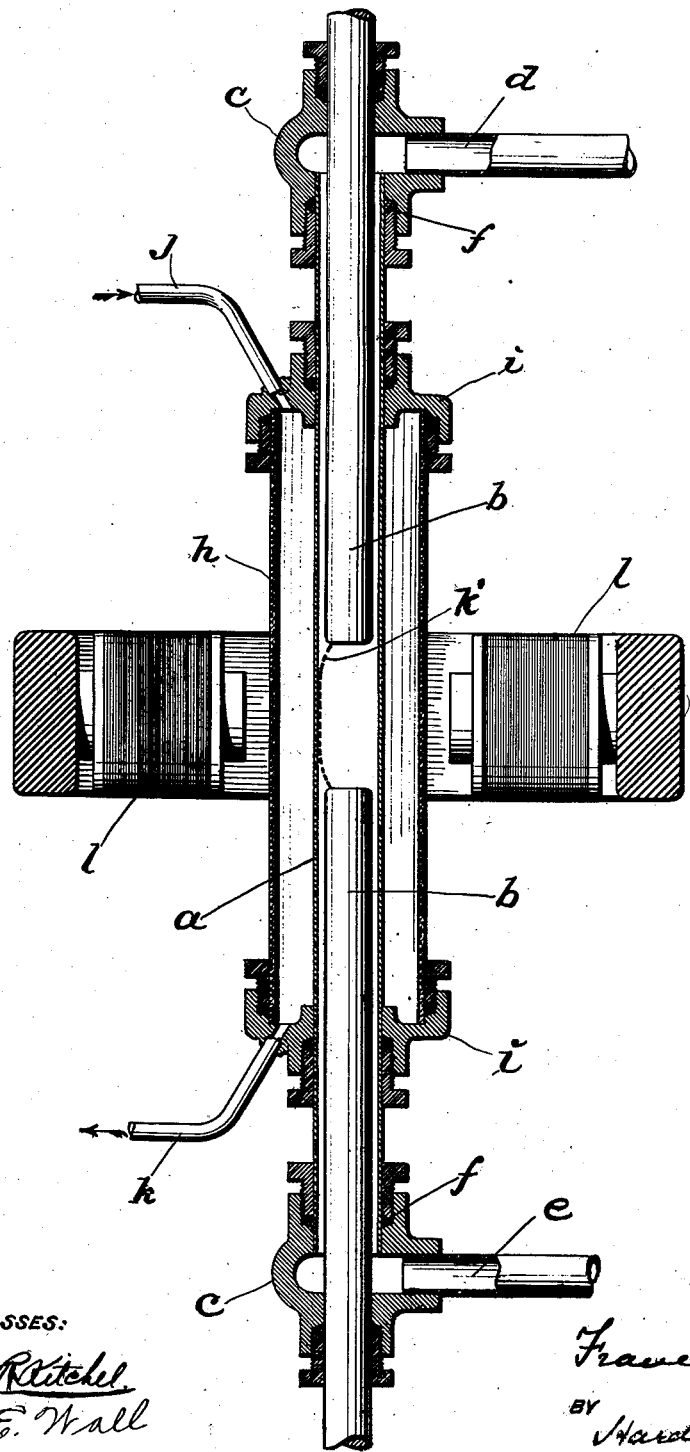
WITNESSES:
INVENTOR
ATTORNEYS.

UNITED STATES PATENT OFFICE.

FRANCIS I. DU PONT, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

PROCESS FOR PRODUCING OXIDS OF NITROGEN FROM THE AIR.

948,372.  Specification of Letters Patent.  Patented Feb. 8, 1910.

Application filed November 14, 1908. Serial No. 462,568.

*To all whom it may concern:*

Be it known that I, FRANCIS I. DU PONT, a citizen of the United States, residing at Wilmington, county of New Castle, and State of Delaware, have invented a new and useful Improvement in Processes for Producing Oxids of Nitrogen from the Air, of which the following is a full, clear, and exact description, reference being had to the accompanying drawings, which form a part of this specification.

Speaking generally, I subject the air contiguous to a cooling medium to the action of a moving arc whereby the high temperature of the air produced by the arc is immediately and rapidly reduced, thus producing the best possible conditions for the production of oxids of nitrogen from the air.

In order to produce a continuous and not disconnected arc, the air container should be of silica or other highly refractory material which is not a conductor of electricity. Preferably I pass the air through a tube formed of silica in which are electrodes between which an arc is formed. Surrounding this silica tube is a glass tube through which a cooling medium, such, for instance, as a cooling liquid, is passed, thus forming a water jacket, as it were, for the silica tube. Surrounding this cooling tube, in proximity to the arc, is a rotary magnetic field, which rotates the arc around the inner surface of the silica tube. The air passing in contact with the inner surface of the silica tube is, by the rotating of the arc, highly heated, and as soon as the arc passes from any portion of the air, such air is immediately subjected to cooling action and its temperature rapidly reduced.

I will now describe an apparatus for carrying out my invention illustrated in section in the accompanying drawing, and then point out the invention in the claims.

$a$ is a silica tube within which are the electrodes $b$ connected with a source of current supply, not shown.

$c$ is a cap applied to each end of the tube $a$, the upper cap having the passage $d$ and the lower cap the passage $e$. Between the cap $c$ and tube $a$ is a packing $f$ tightly inserted to seal the connection at that point. The electrodes $b$ are tightly inserted and thus sealed with respect to the cap. The electrodes are provided with proper feeding mechanism. The cap $c$ is such that one portion of the cap closely surrounds the tube $a$ and another portion closely surrounds the electrodes. Between these two portions of the caps $a$ are, respectively, the passages $d$ and $e$ which connect with the space between the inner wall of tube $a$ and the electrodes $b$. The tube $a$ is surrounded by a tube $h$, preferably formed of glass in order to see the operation within the tube $a$. The ends of this tube $h$ are closed by the caps $i$, one cap having the inlet opening $j$ and the other the outlet $k$ for the circulation of the cooling medium. Surrounding the tube $h$, adjacent to the point of formation of the arc $k'$ between the electrodes, are the field magnets, or ring $l$, which are energized by a polyphase current thus producing a rotary magnetic field.

In operation air is forced in through the passage $e$ into the zone between electrodes. When the arc is produced and the rotary magnetic field in action, the arc is caused to rotate around the inner periphery of tube $a$ coming in contact and acting upon successive portions of the air in contact with said tube. The arc at once highly heats such air. As soon as the arc passes from any portion of the air, such air being in contact with the wall of tube $a$, which is subjected at all times to the action of the cooling medium in tube $h$, has the high temperature produced by the arc immediately and rapidly reduced. By this operation the action of highly heating and cooling any given portion of the air is practically simultaneous, thus more perfectly and with greater certainty forming the oxids of nitrogen from the air. I have found a current of 200 volts and 25 amperes effective. I also force the air in at a pressure from atmospheric to that, say, of one hundred pounds. The oxids of nitrogen thus produced are the lower oxids and with the air unacted on pass along the tube in the space between the electrode and the wall of the tube escaping by the passage $d$ from which they may be led into water where they are converted into nitric acid, in the ordinary manner.

Having now fully described my invention, what I claim and desire to protect by Letters Patent is:

1. The hereinbefore described method of producing oxids of nitrogen from air, which consists in subjecting air in contact with a non-conducting cooling surface to the action of a moving arc extending between electrodes longitudinally of the non-conducting cooling surface and against said cooling surface, whereby the high heating by the arc is immediately and rapidly reduced.

2. The hereinbefore described method of producing oxids of nitrogen from air, which consists in subjecting air in contact with a non-conducting cooling surface to the action of a rotating arc extending between the electrodes longitudinally of the non-conducting cooling surface and against the cooling surface, whereby the high heating by the arc is immediately and rapidly reduced.

3. The hereinbefore described method of producing oxids of nitrogen from air, which consists in subjecting air in a container, which is a non-conducter of electricity and which container is subjected to the action of a cooling medium, to the action of a moving arc extending between electrodes longitudinally of the container and against the inner surface of said container.

4. The hereinbefore described method of producing oxids of nitrogen from air, which consists in subjecting air in a container, which is a non-conductor of electricity and which container is subjected to the action of a cooling medium, to the action of a rotating arc extending between electrodes longitudinally of the container and against the inner surface of said container.

5. The hereinbefore described method of producing oxids of nitrogen from the air in a container, which is a non-conductor of electricity, which consists in forming an arc extending longitudinally within said container, forcing said arc to the inner surface of said container, and moving said arc upon said surface.

6. The hereinbefore described method of producing oxids of nitrogen from the air in a container, which is a non-conductor of electricity, which consists in forming an arc extending longitudinally within said container, forcing said arc to the inner surface of said container, and rotating said arc upon said surface.

7. The hereinbefore described method of producing oxids of nitrogen from the air in a container, which is a non-conductor of electricity, which consists in forming an arc extending longitudinally within said container, forcing said arc to the inner surface of said container, moving said arc upon said surface and cooling said surface.

8. The hereinbefore described method of producing oxids of nitrogen from the air in a container, which is a non-conductor of electricity, which consists in forming an arc extending longitudinally within said container, forcing said arc to the inner surface of said container, rotating said arc upon said surface and cooling said surface.

9. The hereinbefore described method of producing oxids of nitrogen from air, which consists in subjecting air in contact with a non-conducting surface to the action of a moving arc extending between electrodes longitudinally of the non-conducting surface and against said surface.

10. The hereinbefore described method of producing oxids of nitrogen from air, which consists in subjecting air in contact with a non-conducting surface to the action of a rotating arc extending between the electrodes longitudinally of the non-conducting surface and against the surface.

11. The hereinbefore described method of producing oxids of nitrogen from air, which consists in subjecting air in a container, which is a non-conductor of electricity, to the action of a moving arc extending between electrodes longitudinally of the container, and against the inner surface of said container.

12. The hereinbefore described method of producing oxids of nitrogen from air, which consists in subjecting air in a container, which is a non-conductor of electricity, to the action of a rotating arc extending between electrodes longitudinally of the container, and against the inner surface of said container.

13. The hereinbefore described method of producing oxids of nitrogen from the air in a container, with a surface which is a non-conductor of electricity, which consists in forming an arc extending parallel with said surface, forcing said arc against said surface, and moving said arc upon said surface.

14. The hereinbefore described method of producing oxids of nitrogen from the air in a container, with a surface which is a non-conductor of electricity, which consists in forming an arc extending parallel with said surface, forcing said arc against said surface, and rotating said arc upon said surface.

15. The hereinbefore described method of producing oxids of nitrogen from the air in a container, with a surface which is a non-conductor of electricity, which consists in forming an arc extending parallel with said surface, forcing said arc against said surface, moving said arc upon said surface, and cooling said surface.

16. The hereinbefore described method of producing oxids of nitrogen from the air in a container, with a surface which is a nonconductor of electricity, which consists in forming an arc extending parallel with said surface, forcing said arc against said surface, rotating said arc upon said surface, and cooling said surface.

In testimony of which invention, I have hereunto set my hand, at Wilmington, Del., on this twelfth day of November, 1908.

FRANCIS I. DU PONT.

Witnesses:
 Wm. Stainas,
 Gordon L. Naylor.